DELAY LINE PHASE-PULSE GENERATOR

Filed March 19, 1959 4 Sheets-Sheet 1

INVENTOR.
GEORGE H. BARRY
BY Moody and Goldman
ATTORNEYS

INVENTOR.
GEORGE H. BARRY
BY Moody and Goldman
ATTORNEYS

INVENTOR.
GEORGE H. BARRY
BY Moody and Goldman
ATTORNEYS

Jan. 24, 1961 G. H. BARRY 2,969,430

DELAY LINE PHASE-PULSE GENERATOR

Filed March 19, 1959

4 Sheets-Sheet 4

INVENTOR.
GEORGE H. BARRY
BY Moody and Goldman
ATTORNEYS 2,969,430

DELAY LINE PHASE-PULSE GENERATOR

George H. Barry, North Hollywood, Calif., assignor to Collins Radio Company, Cedar Rapids, Iowa, a corporation of Iowa Filed Mar. 19, 1959, Ser. No. 800,435

12 Claims. (Cl. 178—51)

This invention relates generally to phase-pulse modulators, which modulate a carrier or subcarrier frequency with synchronous phase-shifts; wherein the amount of each phase-shift is determined by the digit state of one or more modulating signals.

In the reception of a phase-pulsed signal, an absolute phase standard is not required, since the phase reference for any phase-shift determination is the phase of the received wave itself immediately prior to the phase-shift. Phase-pulse modulation thus has the particular advantage of allowing lower frequency stability than systems requiring a local phase standard.

Phase-pulse modulation can be used to transmit any type of information capable of digital representation such as a teletypewriter signal, or sampled bits of a continuously varying signal.

This invention utilizes a basic system of communications taught in Patent No. 2,676,245 to Melvin L. Doelz, titled "Polar Communication System," issued April 20, 1954.

Furthermore, such system is particularly adaptable for the transmission of plural independent information channels on a single carrier frequency. Two channels are modulated by selecting an appropriate one of four phase conditions for each new phase-pulse with respect to the prior pulse.

However, any number of binary channels can be modulated simultaneously on a single frequency. This is done by encoding the information bits into $2^n$ available combinations and correlating the combinations with $2^n$ different discrete phase-shifts of a carrier frequency where $n$ is the number of channels. Preferably, the different discrete phase-shifts are spaced by integral multiples of a given number of degrees of phase shift. Generally, increasing the number of channels per tone decreases the bandwidth-per-channel but also increases the minimum signal-to-noise ratio required by the receiver.

A plural channel-per-tone system is described and claimed in patent application Serial No. 502,045 of Melvin L. Doelz and Dean F. Babcock, titled "High Speed Transmission of Printed Messages," filed April 18, 1955, and assigned to the same assignee as this application. It provides a modulator system that recirculates a tone between plural magnetostrictive resonators that periodically have their outputs phase-shifted by respective binary signals. The phase-pulsed output is taken from gates connected to outputs of the respective resonators.

Another phase-pulse modulator is described and claimed in patent application Serial No. 626,493 of George H. Barry, titled "Phase-Pulse Generator," filed December 5, 1956, now Patent No. 2,915,633. It utilizes a plurality of frequency dividers connected to a fixed frequency input, with the output of the last divider providing the phase-pulsed output of the generator. It obtains digital phase-shifts of its output frequency as a function of data by either (1) blocking the input for computed number of cycles or (2) by passing a computed number of cycles around one or more of the frequency dividers. Electronic counters and a matrix system controlled by the data determine when and how many cycles should be blocked or by-passed.

The present invention features a delay line and associated logic circuitry to accomplish phase-pulse modulation.

An object of the invention is to provide a phase-pulse modulator that requires relatively few bistable or other active circuits.

It is another object of this invention to provide a phase-pulse modulator having a delay line as a basic item, wherein the delay required for the line is very small compared to the period of the utilized phase-pulse rate.

The invention includes a blocking "and" gate between a pulsed oscillator and an output filter. The enablement of the blocking gate is controlled by a network having a delay line, data-matrix and logic circuitry. The delay line provides a plurality of differently delayed outputs that obtain both a pulse division function and various phase-delay functions used in controlling the blocking gate. The data-matrix determines which phase-delayed output of the delay line shall be used at a particular time as a function of the data. A monostable circuit and at least one bistable circuit are controlled by the data timing, and they actuate logic circuitry to enable the delay-line outputs to be channeled properly to the blocking gate to control its blocking operation.

Further objects, features and advantages of this invention will become apparent to a person skilled in the art upon further study of the specification and accompanying drawings, in which:

Figure 1 illustrates the discrete phase-shifts for phase-pulse modulation of a tone carrying two data channels.

Figures 2(A)–(G) show waveforms used in explaining the operation of the invention.

Figure 4:
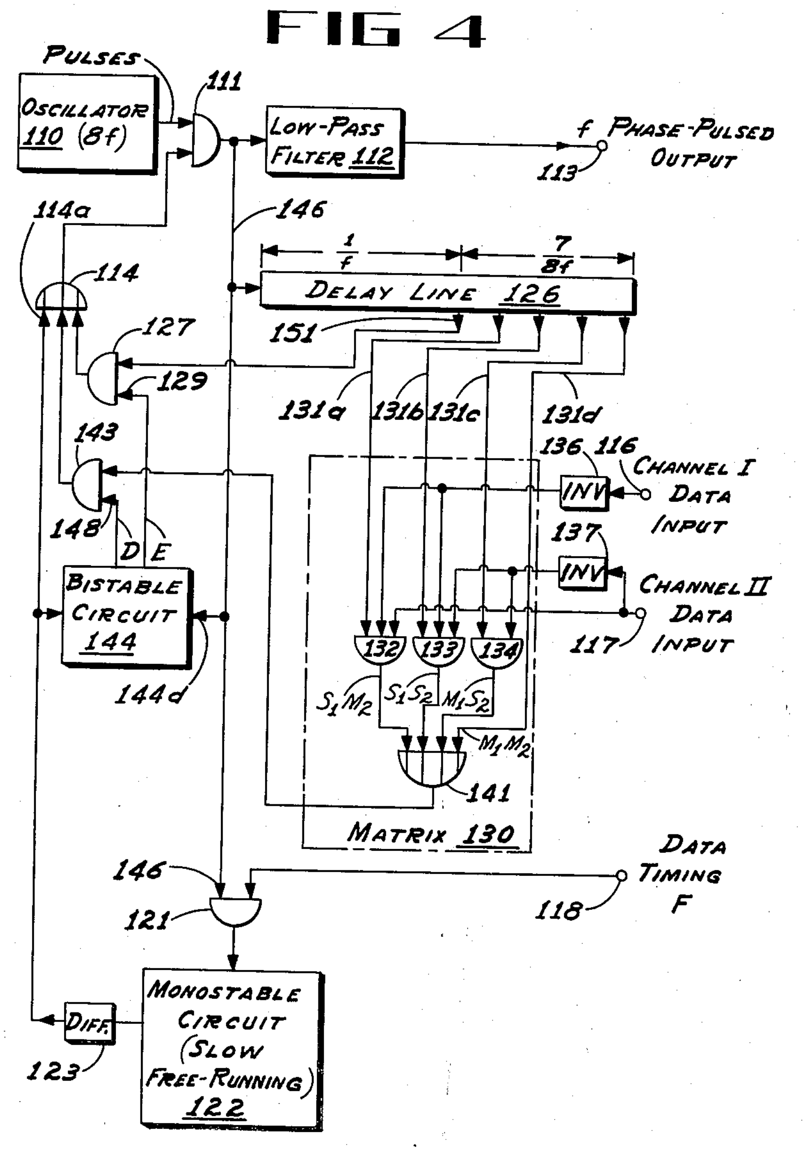
Figure 4 shows another embodiment of the invention.

Figures 5(A)–(F) provide waveforms used in explaining the operation of the embodiment in Figure 4.

Figure 1:
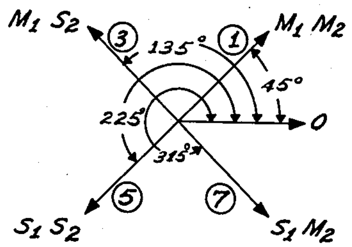
Figure 3:
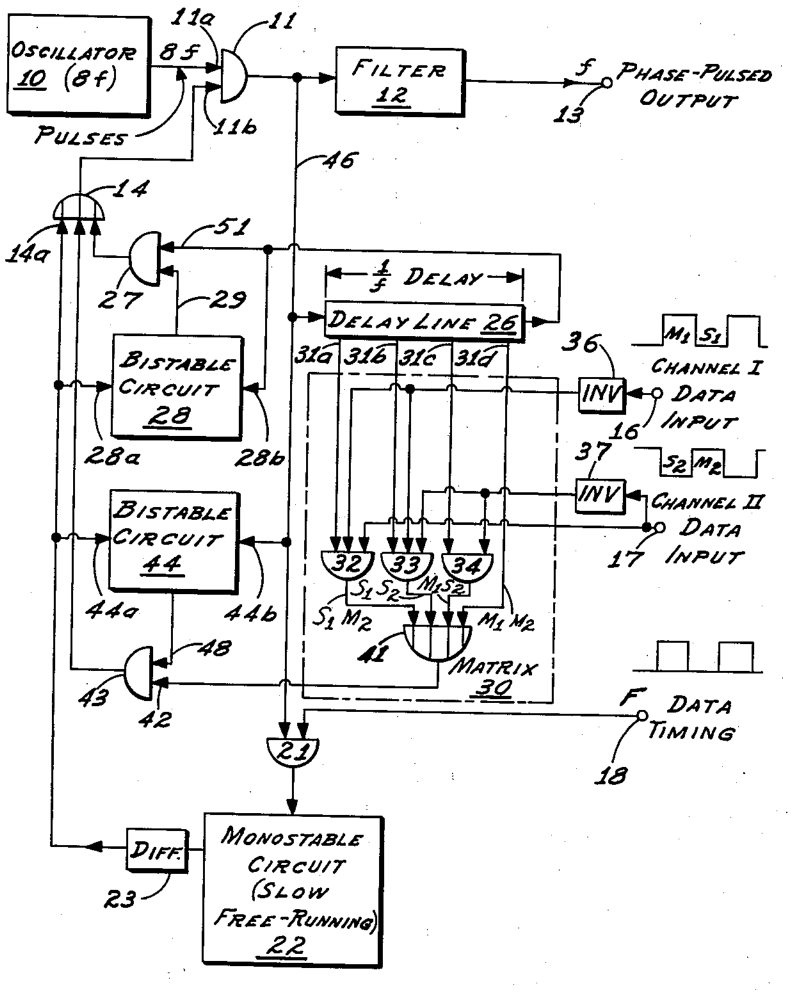
Figure 3 illustrates an embodiment of the invention.

Reference is made to Figure 3, whereat, an output terminal 13 provides a synchronously phase-pulsed signal in accordance with data from two independent channels I and II connected to respective terminals 16 and 17. The output signal at terminal 13 is a sinusoidal-type of wave, which is phase-shifted at synchronous instances with any one of four phase-shifts shown in Figure 1. Each phase-shift corresponds in amount to one of the data combinations encoded as $M_1M_2$, $M_1S_2$, $S_1S_2$, or $S_1M_2$. Thus, a sequence of phase-shifts can simultaneously encode the sequence of data on each of the two binary channels.

Figure 2:
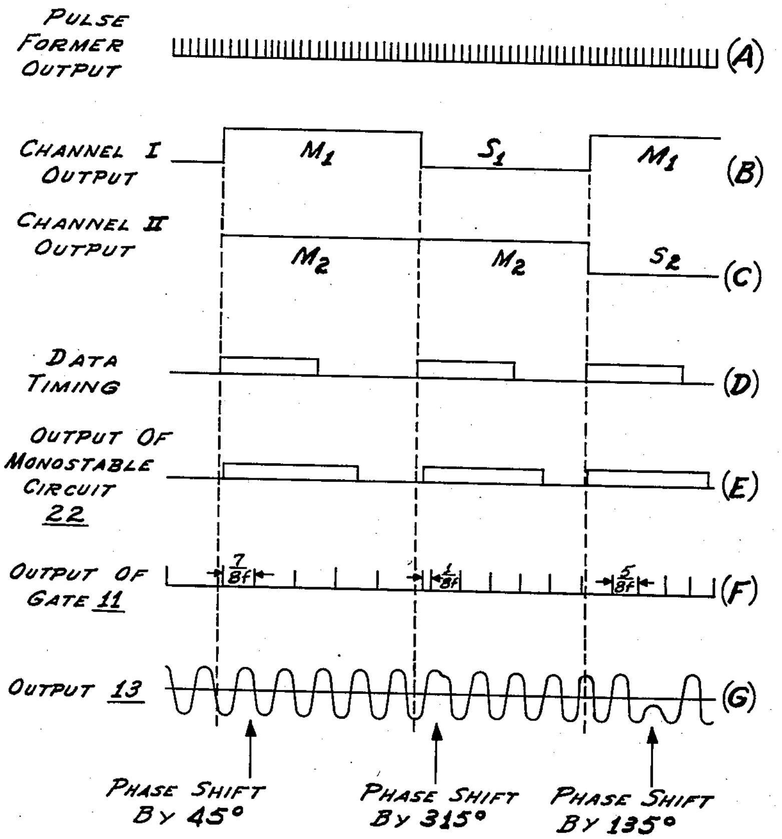

In Figure 3, an oscillator 10 provides an output of short duty-cycle pulses, represented by Figure 2(A) and having a repetition rate $8f$. It will be seen later that $f$ is the carrier frequency of the modulated wave provided at output terminal 13.

An "and" gate 11 has an input 11*a* connected to oscillator 10. An input 11*b* of gate 11 is normally-disabled and is controlled by this invention so that only selected pulses received from oscillator 10 can pass through gate 11 to a filter 12. Filter 12 passes only the fundamental frequency of the pulses received by it so that the wave at output terminal 13 is a sinusoidal-type.

The timing of the modulated phase-shifts provided at terminal 13 is controlled by a timing-source connected to a terminal 18. The source is synchronized with the data and has the data rate F which is much less than the carrier frequency $f$ of the modulated tone.

Because of a repetition-rate divider action in the enablement of gate 11 which is explained later, pulses are normally provided at the output of "and" gate 11 at a repetition rate *f*, which is the carrier frequency of the modulated tone at terminal 13.

Another "and" gate 21 receives at one input the output of "and" circuit 11; and gate 21 receives at another input data-timing pulses from terminal 18. The duration of pulses from the data-timing source should be greater than 1/*f*. Then, coincidence is assured between a data-timing pulse and a pulse from gate 11. A monostable circuit 22 has an input connected to the output of gate 21; and it is triggered near the beginning of a timing pulse, and synchronously with a pulse from oscillator 10.

The pulse duration for monostable circuit 22 is adjusted to be greater than the duration of a timing pulse, and less than the data repetition period. This insures that the circuit is triggered once and only once for each timing pulse, since circuit 22 cannot be triggered while it is in its unstable state.

A differentiating circuit 23 is connected between the output of one-shot circuit 22 and input 14*a* of an "or" gate 14. The output pulse of differentiating circuit 23 has a duration less than 1/8*f*.

A delay-line 26 has an input connected by lead 46 to the output of "and" gate 11. Delay line 26 has outputs 31*a*, *b*, *c*, and *d* tapped at delay intervals from its input of 1/8*f*, 3/8*f*, 5/8*f* and 7/8*f* respectively.

A last output of delay line 26 is delayed by 1/*f* and is coupled to an input 51 of a normally-enabled "and" gate 27. Because of the delay 1/*f*, a repetition-rate-divider action occurs to enable gate 11 only during every 8th pulse from oscillator 10. After a first oscillator pulse passes through the delay line, it passes through normally-enabled "and" gate 27, and "or" gate 14 to input 11*b* to enable gate 11 only during the oscillator pulse existing 1/*f* second later, which is eight oscillator pulses later, to pass through gate 11. Thus, an oscillatory action is established whereby every eighth oscillator pulse passes through "and" gate 11 at the rate *f*; and a divide-by-eight operation results at the output of gate 11 with respect to the pulse rate from oscillator 10.

Monostable circuit 22 is arranged to be free-running (with a period much longer than the data-timing period T) so that self-triggering operation results when the circuit is not being actuated in a monostable manner by pulses from gate 11 and the data-timing source. The free-running action of circuit 22 provides the system with an initial pulse (through inputs 14*a* of gate 14 and input 11*b* of gate11) that starts the pulse-dividing oscillator operation. It is required when the system is first turned on.

A matrix 30 is connected to the tapped outputs 31*a*, *b*, *c*, and *d* of delay line 26. Matrix 30 comprises "and" gates 32, 33 and 34 and an "or" gate 41. Gate 32 also has an enabling input connected to terminal 17 to receive uninverted channel II data. Gates 32, 33 and 34 each have an input connected to respective outputs 31*a*, *b*, and *c* of the delay line. Another input of gates 32 and 33 is connected to terminal 16 through an inverter 36 to receive data from channel I, as shown in Figure 2(B). "And" gates 33 and 34 each have an enabling input connected through an inverter circuit 37 to terminal 17 to receive inverted channel II data, as shown in Figure 2(C). With this type of matrix, the data first enables gate 32 when an $S_1M_2$ data combination is provided, first enables gate 33 when an $S_1S_2$ combination is provided, first enables gate 34 when $M_1M_2$ data is provided, and since none of gates 32, 33 or 34 is enabled by $M_1M_2$ data, a pulse from tap 31*d* is first provided to the matrix output only when $M_1M_2$ data is obtained. "Or" gate 41 has a different input connected to the outputs of each "and" gate 32, 33 and 34, and also has another input connected to tap 31*d* of the delay line. The output of matrix 30 is provided from "or" gate 41 to input 42 of "and" gate 43. It is the first pulse from the matrix output after the beinning of a data pulse which controls the system, because it is fed back through gates 14 and 11 to input 44*b* which triggers circuit 44 to disable gate 43 and prevent it from passing any later outputs from matrix 30 during the same data pulse period. Accordingly, each of the different data combinations provides a separate "first" path from a different delay-line tap to the output of the matrix.

The normal rate-dividing operation is interrupted by each data-timing pulse, shown in Figure 2(D), when it and an oscillator pulse cause triggering of monostable circuit 22. Each resulting pulse from differentiating circuit 23 is also provided to inputs 28*a* and 44*a* of a pair of bistable circuits 28 and 44, respectively. This pulse triggers each bistable circuit 28 and 44 to an opposite output state. Consequently, a normally-enabled "and" gate 27 becomes disabled, and a normally-disabled "and" gate 43 becomes enabled.

At the same time, the oscillator pulse enabled by differentiating circuit 23 to pass through gate 11 is provided to the input of delay line 26 from lead 46. As the pulse moves down delay line 26, it passes tapped points 31*a–d*. The particular data combination existing at that time hence provides a particular "first" path to "or" gate 41 from one of the tapped points 31*a–d*, such as from 31*a* for $S_1M_2$ data. Thus, the tapped pulse passes through gate 43, which was enabled shortly before by bistable circuit 44. The tapped pulse then passed from gate 43 through "or" gate 14 and enables gate 11 to pass the next oscillator pulse. However, the oscillator pulse next passed by gate 11 will not be the eighth pulse after the last pulse passed by gate 11. See Figure 2(F). Instead, it will be either the first, third, fifth, or seventh pulse depending on the particular data input to matrix 70. For example, the pulse tapped from point 31*a* is delayed by only one oscillator-pulse period 1/8*f*, and is fed back to gate 11 to enable it to pass the very next oscillator pulse. Thus, the other tapped pulse delays of 3/8*f*, 5/8*f*, and 7/8*f* respectively cause the respective 3rd, 5th and 7th oscillator pulses (following the preceding passed-oscillator pulse) to be passed by gate 11. Hence, the normal-pulsing sequence (every eighth pulse being passed) from gate 11 is advanced by either ⅞, ⅝, ⅜ or ⅛ of an output-pulse period 1/*f*, which results in a phase- shift of 315°, 225°, 135° or 45° respectively in the filtered output at terminal 13. This corresponds to the data code given in Figure 1. Note the relationship between Figures 2(F) and (G).

The pulse traveling down delay line 26 providing a tapped output eventually reaches gate 27 from the end of the line. Fortunately it finds "and" gate 27 disabled by virtue of the preceding timing pulse. Yet, this pulse is provided to an input 28*b* to trigger bistable circuit 28 back to its normal state to again enable "and" gate 27. Accordingly, the system returns to its normal divide-by-eight operation, until the next data-timing pulse. However, due to the reduced period between two-pulses in a normal sequence of pulses from gate 11, the sequence of pulses after the reduced period is shifted to a leading phase with respect to the previous phasing of the pulses as shown in Figures 2(F) and (G).

Generally speaking, in practice many more pulses will be provided at the output of gate 11 per data period T than are shown in Figure 2(F), which is thus shown to avoid crowding of the figure.

Consequently, bistable circuit 28 and gate 27 have the purpose of normally passing divider-controlling pulses and of blocking the last pulse representing an old phase. In other words, when the pulse which is sensed at a tap point to obtain a phase shift reaches the end of delay line 26, the phase of the system has already changed. Consequently, it no longer has the proper phase when it is blocked by gate 27.

On the other hand, bistable circuit 44 and gate 43 thus have the purpose of passing only the first pulse representing a new phase, and the purpose of blocking all other pulses from the matrix. Any further tap pulses from the matrix must be blocked since they would cause further phase shifts not wanted by the modulation system.

The modified embodiment shown in Figure 4 eliminates the need for one of the bistable circuits used in Figure 3. This is done by providing a delay line 126 in Figure 4 which has almost twice the delay of line 26 of Figure 3. Line 126 provides a delay of 15/8*f* seconds, when *f* is in cycles-per-second.

The items in Figure 4 which are similar to items in Figure 3 are given like reference numerals with an added prefix "1." The normal divider-feedback pulses are taken from a tapped point 151 that is delayed by 1/*f* from the delay line input. Accordingly, divider-enabling pulses are applied to an input of an "and" gate 127, which is normally-enabled by output E of a bistable circuit 144. Thus a division-by-eight is obtained in Figure 4 by the feedback pulses delayed by 1/*f* in the same manner as with Figure 3.

The opposite output D of circuit 144 normally-disables "and" gate 143. Thus all output pulses from the matrix, except the one used for phase-shifting, are blocked by gate 143. Monostable circuit 122 and a differentiating circuit 123 are actuated by data-timing pulses in the same way as circuits 22 and 23 in Figure 3. The output of differentiating circuit 123 triggers bistable circuit 144 to reverse its outputs, which enables gate 143 and disables gate 127. The pulse from lead 146, which causes triggering of circuit 122, moves up delay line 126 and at terminal 151 finds gate 127 closed; thus the normal divide-by-eight action of the delay line and gate 111 is halted.

Figure 5:
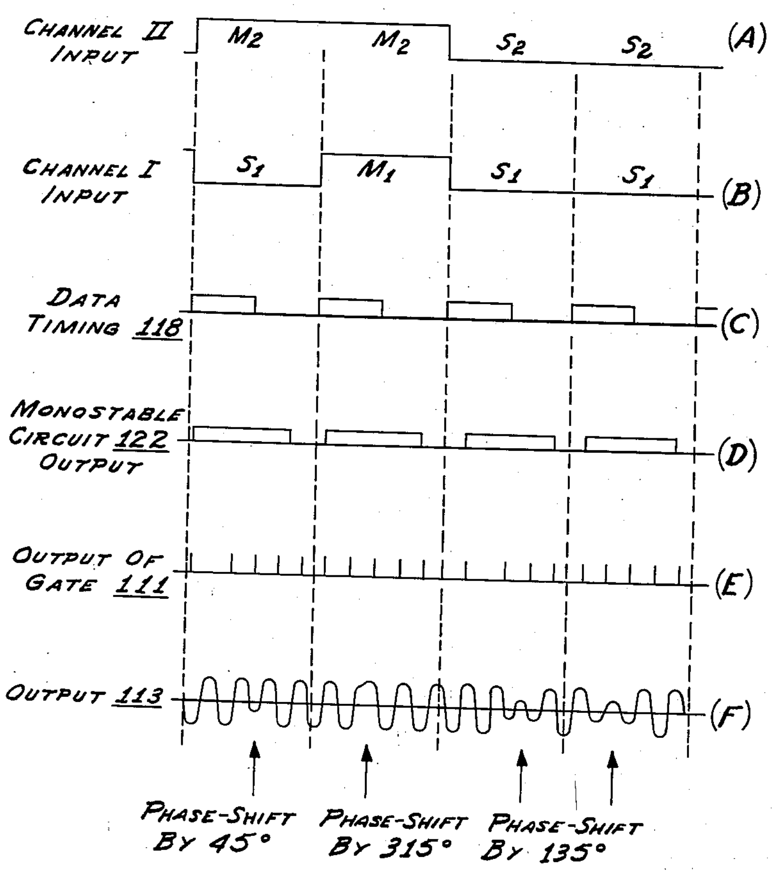

However, when the pulse reaches one of the outputs 131*a–d* connected by the data to provide the first matrix-circuit output, a phase-shift occurs by the same procedure that was described for Figure 3. That is, the pulse passes through enabled gate 143 and "or" gate 114, thus enabling gate 111 to pass an oscillator pulse that occurs 9/8, 11/8, 13/8 or 15/8 of a tone-carried period from the last pulse passed by gate 11. Figures 5(A)–(F) are applicable to Figure 4. Figures 5(E) and (F) illustrate the phase shift characteristics of Figure 4. These various delays cause phase-shifts of 360° or +315°, +225° +135°, or+45°, since integral values of 360° do not alter the basic phase relationships.

Any number ($n$) of channels can be modulated onto a single tone by the system of this invention by providing $2^n$ tapped points along the delay line connected to the matrix. Thus, two tapped points can provide 90° and 270° for a single channel, four tapped points can provide two channels as in the given embodiments, eight tapped points for three channels, etc. The matrix merely correlates the respective $2^n$ data combinations with the respective $2^n$ different valued phase-shifts provided by the $2^n$ tapped points to the matrix for $n$ channels. Hence this oscillator pulse passes to the input of delay line 126 to begin normal divider action and also passes to input 144*b* to reset bistable circuit 144 so that "and" gate 143 is disabled and "and" gate 127 is enabled.

Although this invention has been described with respect to particular embodiments thereof, it is not to be so limited as changes and modifications may be made therein which are within the full intended scope of the invention as defined by the appended claims.

I claim:

1. A phase-pulse modulator, comprising an oscillator providing a pulsed output, a blocking "and" gate having at least a pair of inputs, with one input connected to the output of said oscillator, a delay line having an input connected to an output of said blocking "and" gate, a normally enabled "and" gate having an input connected to an output of said delay line, means connecting an output and said normally enabled "and" gate to another input of said blocking "and" gate, a first bistable circuit having a resetting input connected to the output of said delay line, a normally-enabled output of said first bistable circuit connected to another input of said normally-enabled "and" gate, a second bistable circuit having a resetting input connected to an output of said blocking "and" gate, a normally-disabled "and" gate having an input connected to the output of said second bistable circuit, an output of said normally-disabled "and" gate being provided to an input of said blocking "and" gate, a matrix connected between a plurality of tap points on said delay line and an input of said normally-disabled "and" gate, at least one data channel connected to said matrix, a monostable circuit, a differentiating circuit connected between the output of said monostable circuit and the second input of said blocking "and" gate, a setting input of said first bistable circuit and a setting circuit of said second bistable circuit connected to said differentiating circuit, a timing "and" gate having one input connected to an output of said blocking "and" gate, a data timing source connected to another input of said timing "and" gate, an output of said timing "and" gate triggering said monostable circuit, and filtering means connected to the output of said blocking "and" gate to provide a signal phase-pulsed by the data channel.

2. A modulator as defined in claim 1 in which said matrix comprises a plurality of "and" gates, at least some having inputs coupled to said tap points, and a plurality of data channels connected to other inputs of at least some of said "and" gates.

3. A modulator as defined in claim 2 in which said oscillator provides output pulses at a rate 8*f*, said delay line providing a delay of 1/*f* between its input and its output.

4. A modulator as defined in claim 3 having four intermediate tap points with respective delays of 1/8*f*, 3/8*f*, 5/8*f*, 7/8*f* respectively.

5. A modulator as defined in claim 4 in which said matrix comprises three "and" gates, each having an input respectively connected to the first three of said tap points, said first and second "and" gates having inputs respectively connected to a first data channel, another input of said first "and" gate being connected to a second data channel, the second and third being also connected to said second channel in inverted relationship, an "or" gate having inputs connected to the outputs of said "and" gates and to the fourth tap of said delay line.

6. A modulator of a phase-pulsed tone, comprising an oscillator having a pulsed output with a repetition rate of N*f*, a blocking "and" gate having a first input connected to an output of said oscillator, a delay line having an input connected to an output of said blocking "and" gate, an output point on said delay line delayed by 1/*f* from its input, a normally-enabled "and" gate having an input connected to said output point, at least one tap point of said delay line provided at a delay of a fraction of 1/*f* from the delay line input, a matrix having an input connected to said tap point, at least one data channel connected to said matrix to control whether or not a pulse from said tap point reaches an output of said matrix, a normally-disabled "and" gate having an input connected to an output of said matrix, bistable means having outputs connected to respective inputs of said normally-enabled and normally-disabled gates, a setting input of said bistable means being connected to the output of said blocking "and" gate, a monostable circuit having a triggering input, a timing "and" gate having an output connected to the triggering input of said monostable circuit, one input of said timing "and" gate being connected to the output of said blocking "and" gate, a data timing source connected to a second input of said timing gate, a differentiating circuit connected between an output of said monostable circuit and a reset input of said bistable means, isolation means connected between an input of said blocking "and" gate and outputs of said normally-enabled "and" gate, normally-disabled "and" gate and said differentiating circuit, and filtering means connected to the output of said blocking "and" gate to provide a phase-pulse modulated tone at a carrier frequency of $f$.

7. A modulator as defined in claim 6 in which a plurality of tap points are provided on said delay line and are spaced from its input by fractions of $1/f$.

8. A modulator as defined in claim 6 in which said bistable means comprises first and second bistable circuits, the first having a resetting input connected to an output of said delay line, the outputs of said bistable circuits being respectively connected to inputs of said normally-enabled and normally-disabled gates.

9. A modulator as defined in claim 7 in which said isolation means is an "or" gate, said plurality of tap points being spaced from said input point by delays that are integral multiples of a period of said oscillator output pulses.

10. A modulator as defined in claim 9 in which four tap points are provided which are spaced from said output point by respective integral multiples 1, 3, 5 and 7 of a period of the output carrier frequency from said modulator.

11. A modulator as defined in claim 9 in which the matrix comprises a plurality of "and" gates, each having a plurality of inputs and an output, one input of at least some of said "and" gates being respectively connected to a different one of said tap points of said delay line, a plurality of data channels being connected to other inputs of said "and" gates, a matrix "or" gate connected to the output of said "and" gates, and output of said "or" gate being connected to an input of the normally-disabled "and" gate.

12. A modulator as defined in claim 11 in which the repetition rate $Nf$ of the output pulses of said oscillator is $8f$, and a last tap point is connected to an input of said matrix "or" gate, and said monostable circuit is constructed as a slow free-running multivibrator.

No references cited.